United States Patent
Schick et al.

(10) Patent No.: US 7,403,212 B2
(45) Date of Patent: Jul. 22, 2008

(54) METHOD AND APPARATUS FOR THE DISPLAY OF STILL IMAGES FROM IMAGE FILES

(75) Inventors: Darryl R. Schick, Lafayette Hill, PA (US); Mark A. Zlotnik, Hatboro, PA (US)

(73) Assignee: Microsoft Corporation, Redmond, WA (US)

( * ) Notice: Subject to any disclaimer, the term of this patent is extended or adjusted under 35 U.S.C. 154(b) by 271 days.

(21) Appl. No.: 11/323,248

(22) Filed: Dec. 30, 2005

(65) Prior Publication Data

US 2006/0192791 A1    Aug. 31, 2006

Related U.S. Application Data

(60) Continuation of application No. 11/004,029, filed on Dec. 2, 2004, which is a division of application No. 10/058,693, filed on Jan. 28, 2002.

(60) Provisional application No. 60/338,122, filed on Nov. 13, 2001.

(51) Int. Cl.
*G09G 5/00* (2006.01)
(52) U.S. Cl. .................. 345/661; 345/603; 345/604
(58) Field of Classification Search ............ 345/660, 345/603, 604, 661
See application file for complete search history.

(56) References Cited

U.S. PATENT DOCUMENTS

| 4,660,074 A | 4/1987 | Schine |
| 5,138,459 A | 8/1992 | Roberts et al. |
| 5,519,438 A | 5/1996 | Elliott et al. |
| 5,576,757 A | 11/1996 | Roberts et al. |
| 5,712,713 A | 1/1998 | Hamanaka et al. |
| 5,764,201 A * | 6/1998 | Ranganathan ............. 345/3.3 |
| 5,995,164 A | 11/1999 | Tsyrganovich |
| 6,038,034 A | 3/2000 | Nishio et al. |
| 6,043,845 A | 3/2000 | Thompson |
| 6,094,219 A | 7/2000 | Roberts et al. |
| 6,115,009 A | 9/2000 | Ikegami |
| 6,147,742 A | 11/2000 | Bell et al. |
| 6,163,346 A | 12/2000 | Tsyrganovich |
| 6,202,061 B1 | 3/2001 | Khosla et al. |

(Continued)

FOREIGN PATENT DOCUMENTS

WO    WO 99/56463    11/1999

(Continued)

OTHER PUBLICATIONS

"DV vs. Betacam SP: 4:1:1 vs. 4:2:2, Artifacts and Other Controversies," http://www.dvcentral.org/DV-Beta.html, 12 pages, 1997, accessed Nov. 18, 2006.

(Continued)

*Primary Examiner*—Matthew C. Bella
*Assistant Examiner*—Mike Rahmjoo
(74) *Attorney, Agent, or Firm*—Klarquist Sparkman, LLP

(57) ABSTRACT

An apparatus for creating a digital photo album is disclosed. Digital photo albums may be created on the storage media by a method that includes the steps of displaying a group of images, receiving instructions to select a subset of those images and save the subset as an album, compressing the files corresponding to those images and saving the compressed files to the storage medium.

18 Claims, 15 Drawing Sheets

U.S. PATENT DOCUMENTS

| | | |
|---|---|---|
| 6,233,010 B1 | 5/2001 | Roberts et al. |
| 6,292,224 B1 | 9/2001 | Ogilvie |
| 6,313,877 B1 | 11/2001 | Anderson |
| 6,346,951 B1 | 2/2002 | Mastronardi |
| 6,377,210 B1 | 4/2002 | Moore |
| 6,396,472 B1 | 5/2002 | Jacklin |
| 6,496,222 B1 | 12/2002 | Roberts et al. |
| RE38,079 E | 4/2003 | Washino et al. |
| 6,591,059 B1 | 7/2003 | Asada et al. |
| 6,625,307 B1 | 9/2003 | Kanungo et al. |
| 6,650,357 B1 | 11/2003 | Richardson |
| 6,674,464 B1 | 1/2004 | Mizutani et al. |
| 6,674,799 B2 | 1/2004 | Rhee |
| 6,678,009 B2 | 1/2004 | Kahn |
| 6,714,209 B2 | 3/2004 | Van Valer |
| 6,741,289 B1 | 5/2004 | Bicakci |
| 6,751,256 B1 | 6/2004 | Nickel |
| 6,788,331 B1 | 9/2004 | Sacca |
| 6,862,036 B2 | 3/2005 | Adair et al. |
| 6,961,514 B1 | 11/2005 | Neuman et al. |
| 7,050,097 B2 | 5/2006 | Schick et al. |
| 2002/0000998 A1* | 1/2002 | Scott et al. .................. 345/667 |
| 2002/0051201 A1 | 5/2002 | Winter et al. |
| 2002/0056082 A1 | 5/2002 | Hull et al. |
| 2002/0122067 A1 | 9/2002 | Geigel et al. |
| 2002/0126141 A1 | 9/2002 | Mastronardi |
| 2002/0154147 A1 | 10/2002 | Battles |
| 2002/0167538 A1 | 11/2002 | Bhetanabhotla |
| 2002/0180764 A1* | 12/2002 | Gilbert et al. ............... 345/660 |
| 2003/0025807 A1 | 2/2003 | Roberts et al. |
| 2003/0058254 A1 | 3/2003 | Dworsky et al. |
| 2003/0059199 A1 | 3/2003 | Hossain |
| 2003/0063131 A1 | 4/2003 | Ma |
| 2003/0147634 A1 | 8/2003 | Takezawa et al. |
| 2004/0250083 A1 | 12/2004 | Schwab |

FOREIGN PATENT DOCUMENTS

| | | |
|---|---|---|
| WO | WO 00/30338 | 5/2000 |

OTHER PUBLICATIONS

"Sony DVW-2000P 'PAL' System Digital Betacam VTR with Dynamic Motion Control," http://www.bhphotovideo.com/product/389751-REG/Sony_DVW_2000P_PAL_System_Digital.html, 2 pages, accessed Nov. 18, 2006.

U.S. Appl. No. 60/338,122, filed Nov. 2001, Schick.

Tomkins, "The Comdex Fall 2000 Report," The Imaging Resource (http://www.imaging-resource.com), Nov. 17, 2000, 9 pages.

Tomkins, "Microsoft Announces TV Photo Viewer!," The Imaging Resource (http://www.imaging-resource.com), Sep. 21, 2001, 5 pages.

"Photela to Introduce TV Slideshow at COMDEX Fall 2000," (http://www.appliancedesign.com), Nov. 13, 2000, 2 pages.

"Photela to License 'TV Slideshow' Technology to Enable Digital Imaging Applicances," (http://www.prnewswire.com), Jan. 5, 2001, 2 pages.

Web content from www.bbid.com/avicor.html, accessed on Mar. 9, 2004, p. 1.

Web content from www.ces98.nbinteractive.com/docs/video.html, accessed on Mar. 9, 2004, pp. 1-6.

Web content from www.iomega.com/na/products/product$_{13}$ detail, accessed on Mar. 9, 2004, pp. 1-5.

Gibson et al., *Digital Compression for Multimedia Principles and Standards*, Morgan Kaufmann Publishers, Inc., pp. i-xi, 291-308, 461-476 (1998).

Pennebaker et al., *JPEG: Still Image Data Compression Standard*, Van Nostrand Reinhold, pp. i-xi, 65-96, 632-638 (1993).

\* cited by examiner

[10]

[12]

METHOD AND APPARATUS FOR THE DISPLAY OF STILL IMAGES FROM IMAGE FILES

PRIORITY

This application is a continuation of U.S. patent application No. 11/004,029, filed Dec. 2, 2004, which is a divisional of U.S. patent application No. 10/058,693, filed Jan. 28, 2002, which claims the benefit of United States Provisional Patent Application No. 60/338,122, filed Nov. 13, 2001, the disclosures of which are incorporated herein by reference in their entirety, including all text and drawings thereof.

FIELD OF THE INVENTION

The present invention relates generally to image file storage and retrieval systems. More particularly, the present invention relates to a method and system for creating digital photo albums on a standard storage device.

BACKGROUND OF THE INVENTION

Digital photography is steadily growing in popularity. Digital photography offers several advantages over film photography: photos are available immediately, there are no costs for film or processing, and digital images can be instantly shared with anyone via electronic transmission. Despite these advantages, enjoyment of digital photographs is limited because the common viewing medium is the computer monitor. Digital photography is not likely to reach its full potential as long as people need to stand around a computer in order to enjoy their photos.

Digital photos can also be printed, much like conventional film photos. However, producing good quality prints from digital photos requires expensive printers and printer supplies.

Digital camera manufacturers have long recognized an alternative way to enjoy digital photos: to view the photos on a standard TV set. Most digital cameras have TV output capability, allowing the photographer to view recently captured images on their TV set. Unfortunately, using a digital camera to view images on TV has many drawbacks. For example, only those images presently stored in the camera can be viewed. In addition, the camera must be available at each viewing location, and cables must be reconnected for each viewing session. Further, there is no remote control capability and video images produced by digital camera technology are generally poor in quality. In addition, the high cost of digital cameras makes this option impractical for sharing photos with friends and relatives.

Viewing digital photos on TV sets presents a tremendous opportunity for the digital photography industry, because there are some 250 million TVs in 100 million households in the United States alone. Many of these households would be able to enjoy digital photos on their TV sets if there were a simple, inexpensive way to make this possible.

SUMMARY OF THE INVENTION

In accordance with a preferred embodiment of the invention, a method of storing a collection of digital images on a storage medium includes the steps of displaying a group of images for which corresponding image files are available, prompting a user to select a plurality of selected images from the group, prompting the user and/or receiving an instruction from the user to save the selected images to the storage medium as an album of images, and automatically performing the steps of: (i) making a copy of each image file that corresponds to the selected images to result in image file copies; (ii) making a "contact sheet" image comprised of a user-selected album title having a font and color selected by the user, and including small thumbnail representations of the images contained in the album; (iii) compressing the image file copies; and (iv) saving the image file copies to the storage medium.

Optionally, the method may also include the step of making a "contact sheet" image comprised of a user-selected album title having a font and color selected by the user, and including small thumbnail representations of the images contained in the album. It may also include the step of automatically adjusting the image file copies so that the selected images, when displayed, have a resolution not exceeding that which is required for optimal display on a standard display such as a television screen. The method may also include the steps of prompting the user to make one or more modifications to any of the selected images, automatically adjusting the image file copies corresponding to the selected images for which the user makes one or more modifications so that said image file copies result in adjusted image files that include the one or more modifications, and (in the saving step) ensuring that the image file copies that have resulted in adjusted image files are saved as adjusted image file copies. Optionally, the method further includes the step of saving, to the storage medium, a file that contains parameters of the album, such that the file allows a user to automatically recreate the album for further duplication or modification.

In accordance with an additional embodiment, the invention comprises computer-readable carrier containing instructions that are capable of instructing a computing device to perform any or all of the above-described functions.

There have thus been outlined the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

The invention described herein provides a method and system for the display of still images on a standard monitor. In a preferred embodiment, the invention is a stand-alone product that provides display of digital images on standard television sets, such as National Television Systems Committee (NTSC) television displays used primarily in North America and Japan, Phase-Alternating Line (PAL) televisions displays used primarily in Europe, and other television standards that combine synchronization pulses with a video signal containing chrominance and luminance information. For example, the invention may take the form of a television set-top box, or it may be provided in the form of a portable electronic device. Optionally, however, the invention may be provided within another device, such as in or on one or more cards within a personal computer or laptop, or it may be included as part of another device such as a digital video disk (DVD) player or video cassette recorder (VCR), or it may even be included within the housing of a television set itself.

Other embodiments not described herein are also possible, so long as they include the features and elements of the invention. In addition, although a preferred embodiment displays the images on a standard television set, the invention may also be used for the display of still images on another video device, such as a small handheld TV, a TV monitor, a large-screen projection TV, or a computer projection device which includes a video-to-RGB scan conversion mechanism. The device may also be used to create videotaped slideshows, by simply connecting the device's video output to the video input of a VCR.

Figure 1:
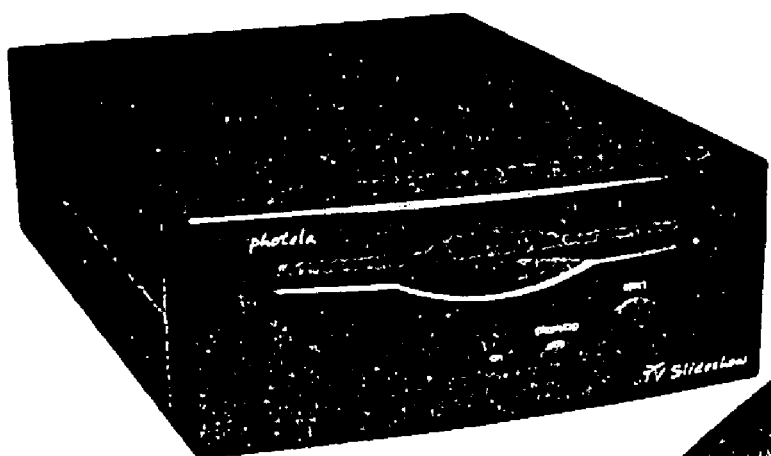
FIG. 1 illustrates an exemplary set-top box embodiment of the invention.
Figure 1:

The invention is first described herein from the view of the end user. The invention provides a method and system that facilitates the creation and display of albums containing digital photos on a standard TV set. A preferred embodiment of the Invention includes the following items, the second and third of which are illustrated in FIG. 1: (1) PC-based software that allows easy creation of a digital photo album tailored for TV viewing; (2) a small set-top box 10 which displays the digital photo album on a standard TV or other monitor, and (3) optionally and preferably, a remote control 12 used to operate the set-top box, preferably from up to fifty feet away or more. These aspects are described separately below.

PC-based software that allows easy creation of a digital photo album tailored for TV viewing: The process of creating a TV photo album is facilitated by the PC-based software. It is assumed that the user has accumulated a collection of digital images, which may exist in a variety of standard image formats (e.g., JPG, BMP, GIF), and in a range of resolutions (e.g., 640×480, 1024×768, or other sizes). The images may or may not have an aspect ratio (width-to-height ratio) that equals the 4:3 aspect ratio of standard TVs.

Standard TVs have a fixed aspect ratio of 4:3 and a fixed display resolution of approximately 640×480 pixels. Therefore, when a TV is used with the invention, digital images with higher resolution (e.g., 800×600 or larger) should be resized to 640×480 in order to best fit the TV screen.

In the invention, aspect ratio adjustment and resizing of images to necessary resolution, such as 640×480 resolution, is preferably performed automatically by PC-based software during the album creation process. As a result, the images, having been reduced in size for TV viewing or viewing on the available monitor, may be stored on a small, inexpensive, removable media such as a standard 3.5 inch Floppy Disk. Regardless of the media type used, this pre-processing step facilitates highly efficient use of the media by eliminating information which exceeds the available resolution of the TV or monitor to be used for viewing the images. In contrast, prior art approaches store the full-resolution image on the removable media. Storing full-resolution images on the digital media, which is how the prior art attempted to solve these problems, has several drawbacks. For example, a much larger storage media is required, a media writer for this larger media is required, image decoding requires more time and/or processing power, the set-top box would be unnecessarily complicated and expensive, and sending the TV photo album via e-mail requires significantly longer transmission time.

Figure 2:
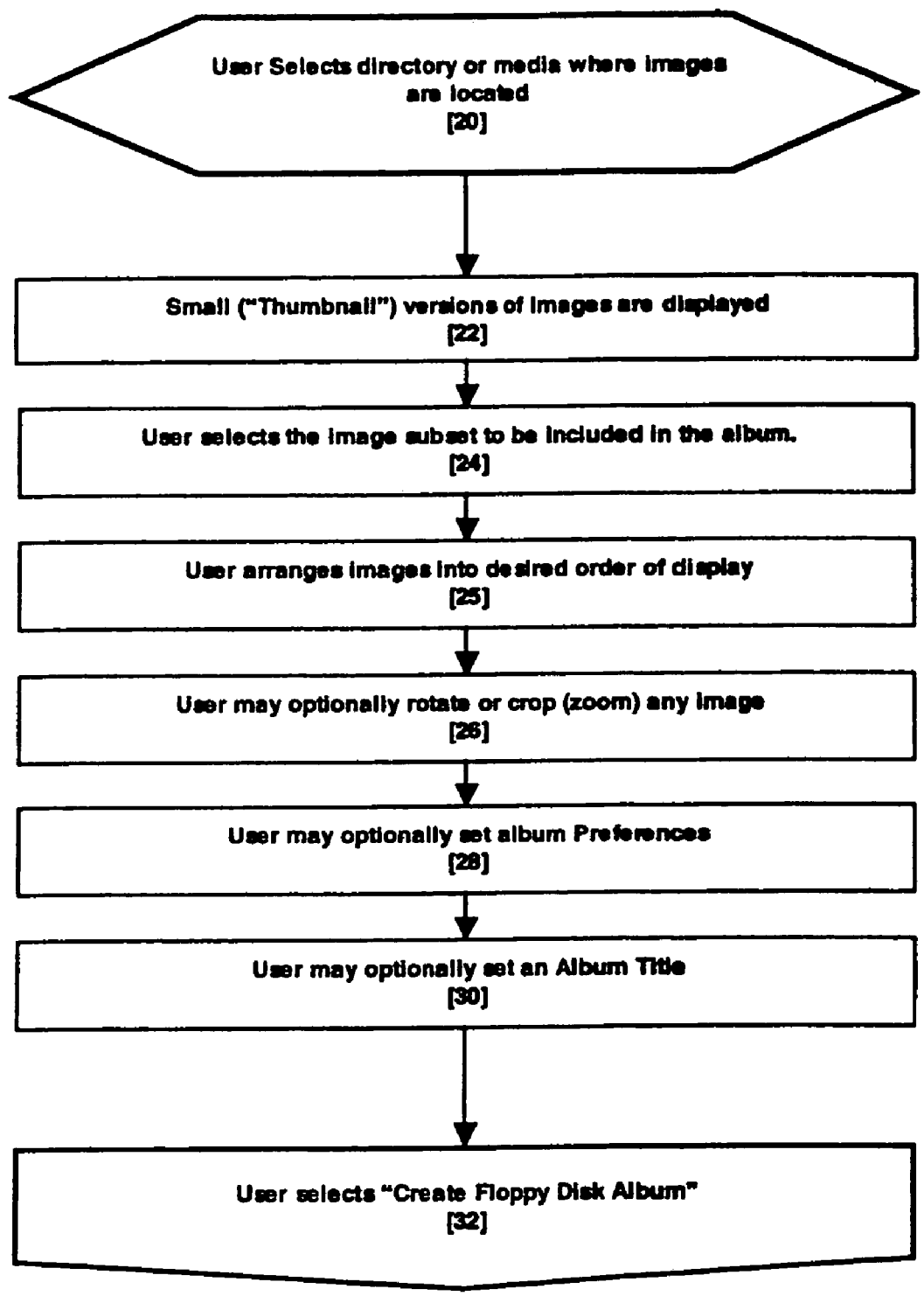
FIG. 2 is a flowchart that illustrates several steps that may be implemented by the software embodiment of the invention.
Figure 4:
FIG. 4 illustrates an exemplary screen showing "thumbnail" images that a user may select for inclusion in an album.
Figure 5:
FIG. 5 illustrates the cropping and rotating features of a preferred embodiment of the invention.

The PC-based software implemented as part of the invention solves several problems that would otherwise complicate the album making process. As illustrated in FIG. 2, the operational flow of the software reduces the album-making process to the simplest possible form. After launching the software application, the user selects the directory where digital images are stored (step 20). Several, and preferably all, images in the directory may be displayed in small "thumbnail" form (step 22). An example of a screen showing such "thumbnail" images is provided in FIG. 4. Optionally, less than all images in the directory may be displayed. Returning to FIG. 2, the user then selects the images that will comprise the album, and the remainder are removed from the display (step 24). The user may optionally rearrange the images into the preferred order of display, by selecting images and dragging them into the preferred position (step 25). The user may optionally perform simple tasks such as rotation and/or cropping on selected images (step 26). An example of such cropping is shown in FIG. 5. Returning to FIG. 2, the user may also set preferences for aspects such as image quality, title page font and color (step 28). Optionally, the user may enter a "title" for the album (step 30). The user inserts a floppy disk or other recordable medium such as a CD, ZIP drive, or even an instruction to select a storage device such as a hard drive, network drive, or flash memory, and clicks on a button or other input which may be called something such as "create floppy disk album" (step 32).

Figure 3:
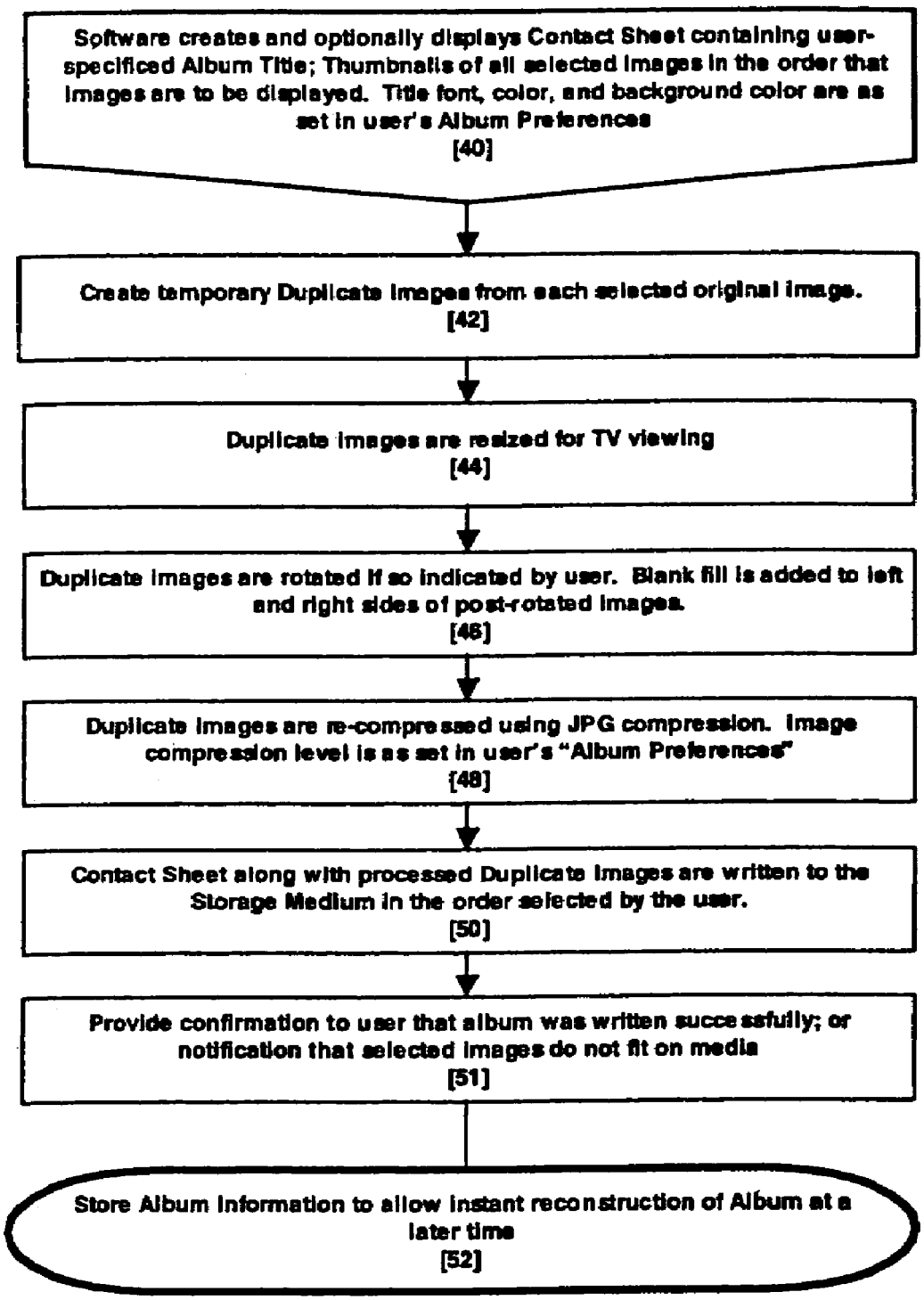
FIG. 3 is a flowchart that illustrates additional steps that may be implemented by the software embodiment of the present invention.
Figure 6:
FIG. 6 illustrates the insertion of black space around a picture.

Following step 32 (e.g., a single click of the "create floppy disk album" button), the software automatically executes a number of processes in a short time, as illustrated in FIG. 3 in flowchart form. Preferably, a "contact sheet" image is created containing thumbnails of all selected images in the album and the album title as entered by the user. When the album is viewed on the TV, this contact sheet preferably will be displayed first in order to quickly orient the user as to which album they are viewing (step 40). A copy is made of each original image selected by the user (step 42). The copied images are resized (if necessary) so that the final image size is fixed at 640×480 pixels (step 44). If the original image has an aspect ratio different than 4:3, fill, such as black space, is preferably added to "letterbox" the sides or the top and bottom of the image as needed to retain the original proportionality of the image area (step 46). An example of a screen showing such black space is provided in FIG. 6. Preferably, the original image file is not modified or overwritten during this process. Returning to FIG. 2, the images are recompressed, preferably as JPG images at a compression ratio that will allow them to fit onto a standard storage medium such as a 3½ inch, 1.44 MB floppy disk (step 48). For example, if thirty-six images are selected by the user, and if a 1.44 MB floppy is used, the final size of each image will be no more than approximately 38 kB each. Preferably, if the recompressed images will not fit on the disk or other storage medium, the user is informed of this, and the user is provided the option to change the image compression setting or remove one or more photos from the album. The images are written to the storage medium in the order selected by the user (step 50). The program will then inform the user that the images have been successfully written to the media (or, if applicable, indicate an error condition) (step 51). When viewed on a TV, the images will appear in this order. The album information preferably will be stored in a separate file allowing the user to instantly recall and recreate the album at a later time (step 52).

Figure 7:
FIG. 7 illustrates an example of a contact sheet that may be used to display multiple photos contained in an album.

After the automatic completion of steps 40 through 52, the software informs the user that the stored album has been created and is ready for display on the TV using the set-top viewing device. Optionally, as illustrated in FIG. 7, the user may print or view a "contact sheet" to allow easy location of any photo in any album.

After creating a stored photo album, in a preferred embodiment a small TV set-top box is used to display the images on a TV. An exemplary set-top box 10 and remote control 12 as implemented in the preferred embodiment are illustrated in FIG. 1.

A set-top box which displays the digital photo album on a standard TV or other monitor. The set-top box embodiment of the present invention preferably has many or all of the following attributes. It is completely stand-alone, requiring no connection to a computer. Only a power input is required, although optionally a battery power source may be used. It contains a media reader (a floppy disk drive in the preferred embodiment, but optionally it could be a CD, DVD, ZIP, flash memory, hard disk, or other drive) to read the digital photo album images. It contains hardware, software, and preferably firmware that transform JPG digital images into TV video signals. Finally, it preferably responds to commands from a handheld remote control device and/or front-panel control buttons.

The set-top box contains a number of unique technologies that differentiate it from other products that can display digital, images on a TV. Previous products that show photos on TVs are based upon industry-standard PC processor chipsets (e.g., Intel 486, Motorola PowerPC processors). In contrast, a preferred embodiment of the invention contains a low cost, low-speed processor, primarily to facilitate user interaction. In a preferred embodiment, this processor is a standard, 8-bit Z80 processor. The invention also preferably contains a fast, application-specific, low-cost JPG image decoder.

The box also preferably includes a Image Processing Memory Portion (preferably, a SDRAM component) that facilitates caching of the floppy disk contents. Once the disk contents have been cached in the Image Processing Memory Portion, the disk media does not need to be accessed again for redisplay of the same image. This same Image Processing Memory Portion is preferably utilized during image processing computations. Since the entire floppy disk contents are cached within the Image Processing Memory Portion, it is possible for the invention to create duplicate copies of an album without the use of a PC, making it easier to share albums with others. After the contents of a disk have been loaded into internal memory, the user inserts a blank formatted floppy disk or other storage medium. The device will then write the digital photo album files to the blank disk. Finally, the set-top box preferably includes a fast, application-specific, low-cost image processor that converts decoded JPG images into high quality TV video signals. The image processor embodied in the invention is unique in several respects.

For example, a complete video image preferably is pre-computed and stored in the image Processing Memory Portion prior to display of the image. This method is superior to the commonly used video scan conversion technique in which final video computations are performed in real-time. Pre-computing the video signal facilitates vertical image filtering, which can be employed to reduce video image flicker.

Pre-computing the video signal also facilitates the addition of phase-compensation pixels between video frames, which eliminates dot crawl in NTSC television displays and provides more efficient utilization of the Video Memory Portion, since the video signal may be based on only two video fields (NTSC) or four video fields (PAL).

Image processing is preferably tailored for optimizaton of still images for viewing on a standard TV. The image processing preferably includes vertical luminance filtering for flicker reduction, horizontal luminance filtering for reduction of cross-chrominance artifacts (i.e., the appearance of "false" color resulting from high frequency luminance), horizontal chrominance filtering for reduction of cross-luminance (i.e., "zipper" or "dot" patterns resulting from highly contrasted chrominance transitions), and a synchronous video modulation technique which eliminates dot crawl artifacts on NTSC televisions (i.e., cross-luminance patterns which appear to be in constant motion).

The particular filter coefficients can vary, and the precise filter values are left to the preference of the user or the designer, as different filter coefficients can result in different image effects and qualities.

A preferred embodiment of the set-top box also contains a Video Memory Portion (preferably, a SDRAM component) that facilitates caching of fully processed video images. These images can be displayed immediately upon the user's command. In the preferred embodiment, "current image," "next image," "previous image," and "informational" images are all simultaneously cached and available for instant viewing. Caching of multiple computed images in the Video Memory Portion directly facilitates picture-in-picture insertion, split image displays, and various image transition effects (e.g., wipe right, wipe down), by simply reading parts of one image superimposed onto parts of another image.

A preferred embodiment of the invention also includes a stand-alone video synchronization generator. This generator creates the video synchronization template (equalization pulses, synchronization pulses, and colorburst phase reference) independently of the image processing operations. By creating the video synchronization template independently of the image processing computations, the Video Memory Portion capacity requirement is reduced, and the Video Memory Portion can be written with new image data any time that synchronization data is being generated (e.g., during equalization pulses, horizontal synchronization pulses, vertical interval video lines, and colorburst).

The preferred embodiment also includes an NTSC or PAL video pattern generator for compatibility with TVs in North America and Japan. Other standards, such as SECAM (used primarily in Europe), S-Video, Component Video, or any video standard involving the combination of video data with synchronization pulses can be implemented in similar alternate embodiments.

It is also preferred that a direct memory access (DMA) controller, which provides efficient transfer of image file data from floppy disk to the Image Processing Memory, as well as efficient transfer of image file data from the Image Processing Memory to a smaller SRAM block, be used for image processing computations.

The preferred embodiment also includes a memory controller, which provides for control of CPU-initiated SDRAM accesses. The memory controller translates CPU-initiated memory access requests into properly formatted SDRAM access cycles, including Initialization, Write, Read, and Refresh operations. The memory controller also provides for control of Z80 or other processor read-only memory (ROM) accesses. The memory controller translates CPU-initiated memory access requests into properly formatted ROM accesses, including control of ROM control signals, read address, and wait state insertion to accommodate ROM access latency.

The preferred embodiment also includes an infrared (IR) signal receiver, which provides serial bit stream decoding of a demodulated IR signal originating from the user's remote control, discrimination of valid IR codes from background noise, and interrupt assertion to the CPU when a valid IR code is received.

The aforementioned elements of the invention are implemented using hardware descriptive language (HDL) firmware coding techniques. HDL coding permits the design to be implemented either in an inexpensive Field Programmable Gate Array (FPGA), or in an Application Specific Integrated Circuit (ASIC). Of course, alternate hardware components are possible, and the invention is intended to include such alternates and equivalents. For example, although the preferred embodiment uses a Z80 processor as a cost-effective element, other processors such as Pentiums or Intel 486s may be used (although they may add unnecessary cost to the final product).

A remote control is preferably used to operate the set-top box. Preferably, the remote control may be operated from up to fifty feet away from the box or more. The remote control device allows digital photo albums to be viewed from a couch or similar accommodation. The remote control preferably includes some or all of the following attributes:

First, the choice of buttons is preferably limited in order to provide ease of use and intuitive discovery of features.

Second, the functions provided preferably include one or more of the following: Forward: to display the next image in the album. Back: to display the previous image in the album. Rotate: to rotate the currently viewed image. The Rotate feature preferably provides counterclockwise rotation, clockwise rotation, and/or restoration of original image rotation on successive presses of the button. Whichever rotation direction is selected will be associated with the same image if the image is re-displayed prior to removal of the disk media. Auto Slideshow: When pressed, initiates an automated slideshow through the album. Photos are preferably displayed in the order selected when the album was created using the PC software. Dwell time between images may be adjustable, preferably in 0.5 second increments, by pressing the Forward or Back buttons during slideshow operation. Power: Activates or deactivates the device. When the device is deactivated, a video passthrough circuit is engaged, channeling the user's VCR or DVD player through to the TVs video input.

Figure 8:
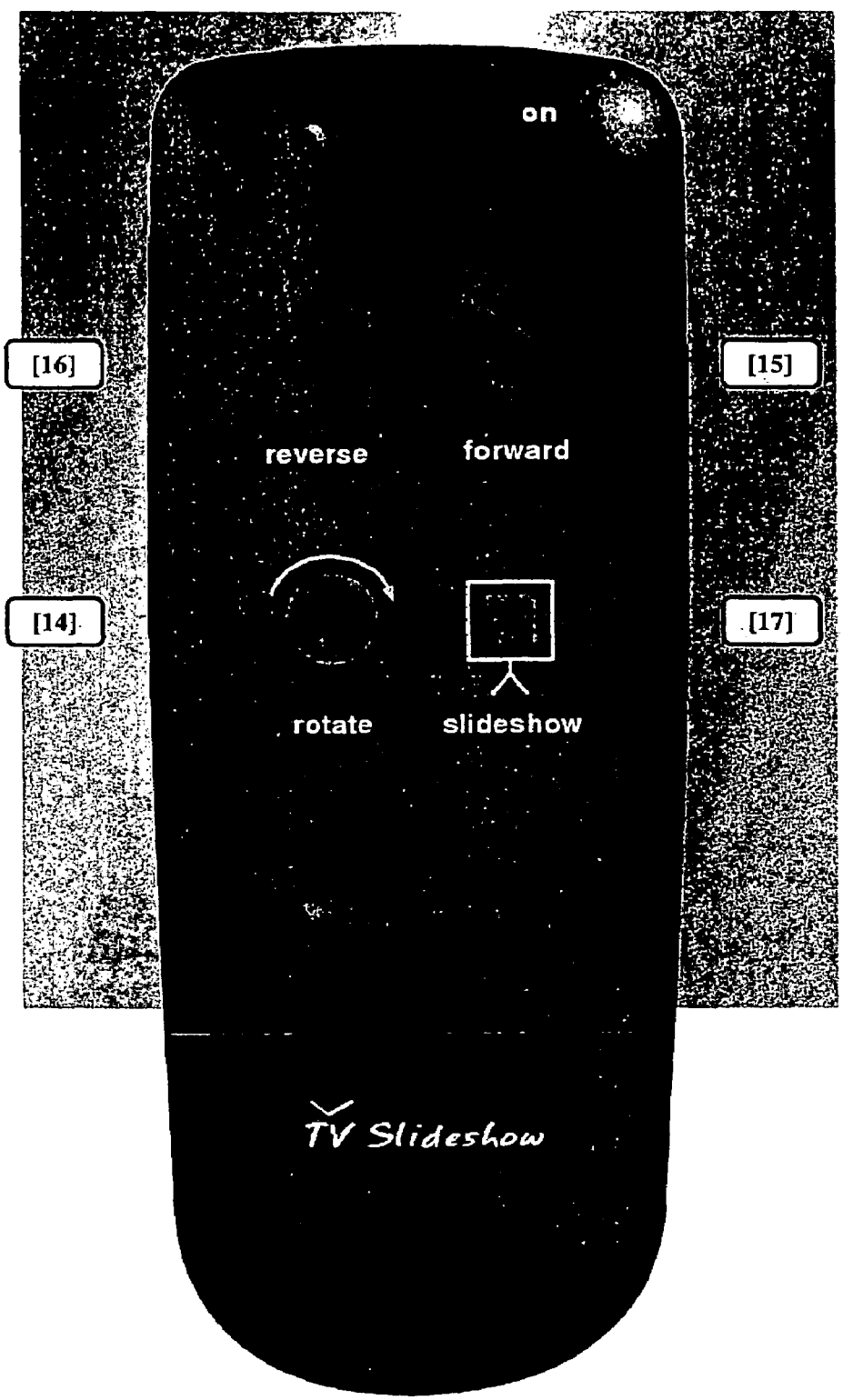
FIG. 8 illustrates an exemplary remote control element.

Preferably, as illustrated in FIG. 8, the shape and color of the buttons are selected to provide immediate intuitive recognition of the remote control functions. For example, the Forward button 15 may be shaped as a triangle pointing to the right, and the Back or Reverse button 16 may be shaped as a triangle pointing to the left. The Rotate button 14 may be round, with a rotating arrow printed around it. The Slideshow button 17 may be square, and superimposed on an illustration of a slide projector screen. Of course any shape or color may be used without departing from the scope of the present invention.

The invention provides several advantages over the prior art. For example, it provides a complete system for creation, viewing, and sharing of digital photo albums. It is also simple enough for non-technical users, and it is designed for optimal video rendition of digital still images when viewed via a standard TV set. Preferably, it also requires only a relatively low cost to produce, since a preferred embodiment utilizes only standard, low-cost, readily available parts, or may be implemented as a low-cost integrated circuit.

The invention is also differentiated from prior art in the following ways, among others. First, the invention addresses the complete process of selecting and arranging digital images into an album, preprocessing the images for efficient storage onto a removable medium, transferring the album images to a removable medium, and viewing the images. Second, the image processing and video processing architecture of the invention are implemented in the form of a highly optimized integrated circuit design, which is far less expensive to produce than the PC-processor based designs on which the prior art was based. Third, the top-level architecture of the invention is optimized to provide superior image processing and video processing performance, at a relatively low cost. Fourth, the invention uses a unique video-processing algorithm that provides video images having stability and clarity far exceeding prior methods. Finally, a preferred embodiment of the invention includes a PC-software component for creating digital photo albums that can be easily shared with other people who may possess the invention, but who may not have access to a computer, or who may lack knowledge of how to operate a computer.

To summarize and provide additional disclosure supporting the invention, the invention is preferably comprised of some or all of the following elements:

(1) Software to facilitate fast, easy creation of photo albums tailored for TV viewing or viewing on a similar type of monitor.

(2) A hardware device connecting to the TV or monitor, (in the preferred embodiment, a TV set-top box); comprised of: (a) a digital media reader (in the preferred embodiment, a standard 3½ inch floppy disk drive, but optionally a CD, DVD, ZIP, Flash Memory, hard disk, or other drive); (b) a digital image decoder for JPG-formatted images (converts JPG image files into a viewable bitmapped image); (c) a digital image processor (converts decoded digital images into high quality television video); (d) a video synchronization generator which produces the video template (i.e. non-image data) including equalization pulses, synchronization pulses, and colorburst phase reference; (e) an optional video bypass circuit; to allow a VCR or DVD or other video signal to be passed through the device when the device is not in use (this feature eliminates the need to reconnect cables on TVs having only a single video input); (f) an optional infrared receiver for the remote control; (g) front-panel control switches; and (h) front-panel LED indicators.

(3) An optional remote control to allow easy operation from up to fifty feet or more away from the device.

Figure 9:
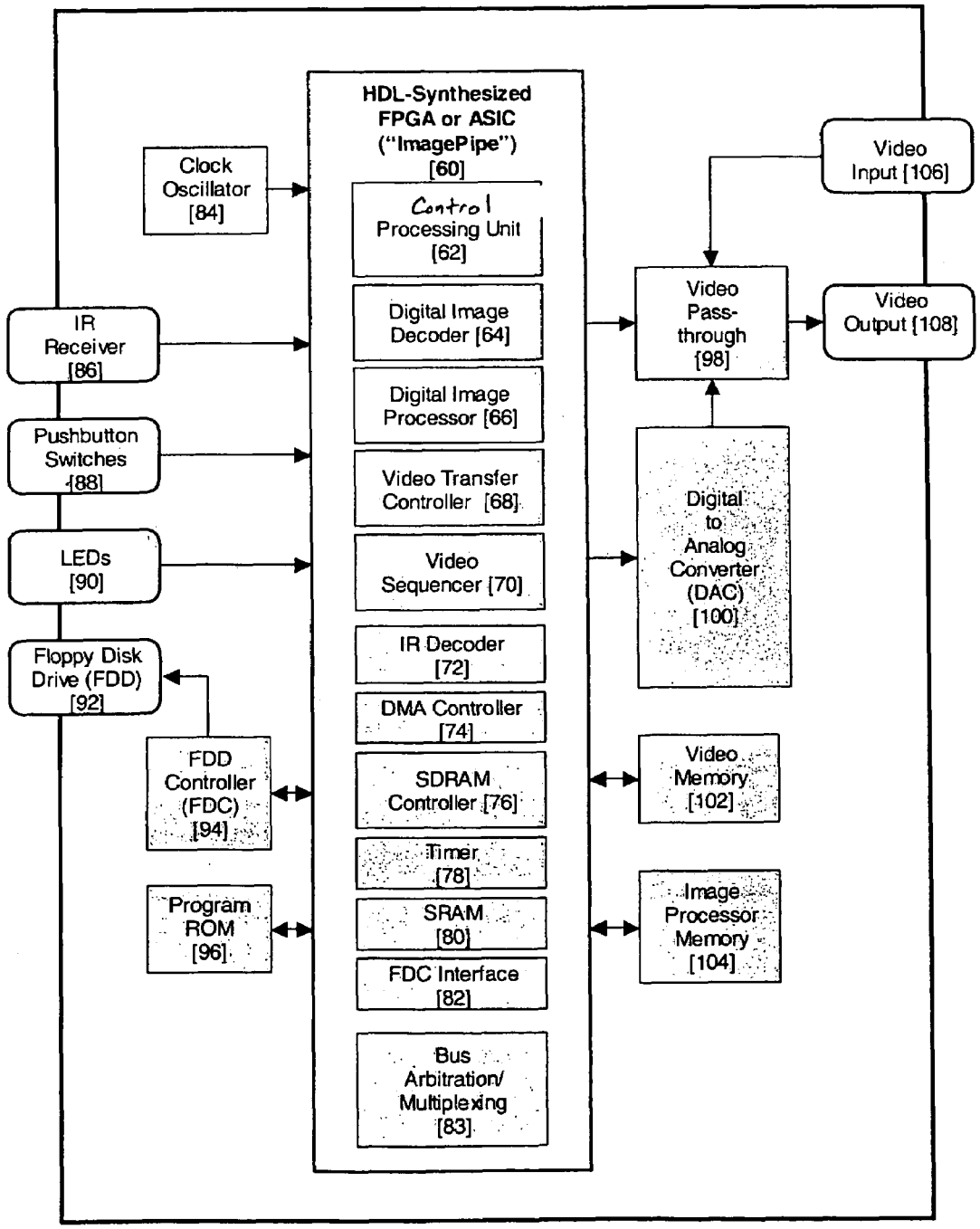
FIG. 9 illustrates preferred architecture included within a preferred hardware embodiment.
Figure 10:
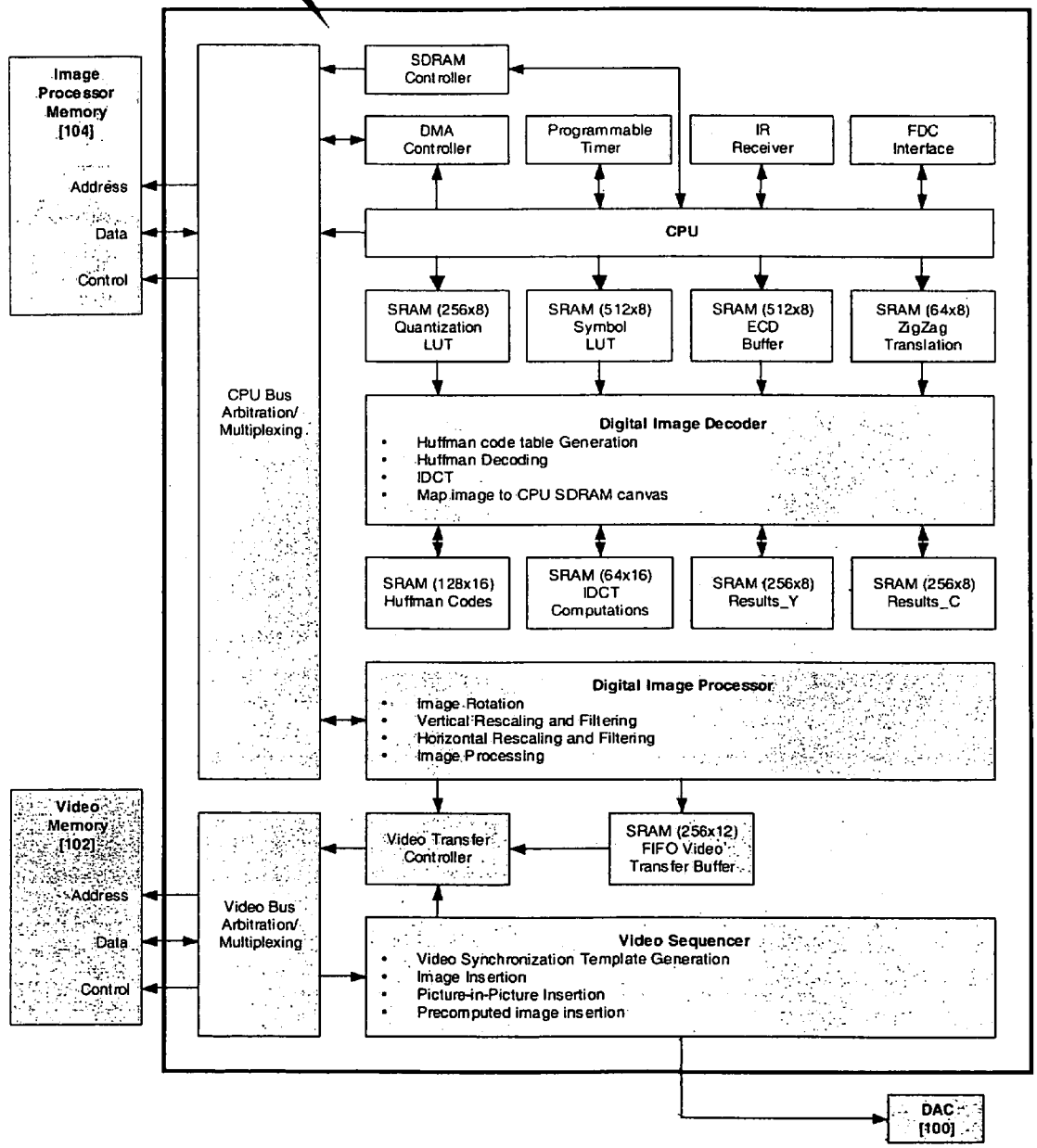
FIG. 10 provides more detailed illustration of the FPGA/ASIC element in the preferred embodiment.

A preferred embodiment of the hardware device (TV Settop) box architecture is illustrated in FIGS. 9 (system diagram) and 10 (detailed diagram of FPGA/ASIC). The preferred set-top box embodiment includes some or all of the components described below.

The FPGA or ASIC 60 is a custom-designed logic component. The design is implemented using Hardware Descriptive Language (HDL) firmware algorithms. The HDL firmware algorithms are synthesized into efficient gate-level logic equivalents using commercially available HDL synthesis tools. Preferably, the synthesized gate-level logic is physically implemented using either a field-programmable gate array (FPGA) or in an application specific integrated circuit (ASIC).

Functions provided by the FPGA or ASIC 60 may include that of a digital image decoder 64, providing parsing of JPG file header information, generation of Huffman code tables, Huffman decoding of entropy-coded data streams, dequantization of decoded data, inverse discrete cosine transform (IDCT), reassembly of decoded image components into fully bitmapped color planes, and resealing of images with Y:Cb:Cr sampling ratios other than 2:1:1.

The FPGA or ASIC 60 provides the function of a digital image processor 66, providing vertical image resealing to fit the TV active window. Preferably, this is a ratio of 23/24 for NTSC, 7/6 for PAL.

The processor 66 function also preferably includes vertical image filtering. Vertical filtering of the luminance component is performed to reduce visual flickering between video fields. In the preferred embodiment, a 7-tap digital FIR filter is utilized Horizontal image rescaling to fit the TV active window is also provided. Preferably, this is a ratio of 9/8 for NTSC, 25/18 for PAL. Horizontal filtering of the luminance component is also performed to reduce "cross-chrominance" artifacts. In the preferred embodiment, a 7-tap digital FIR filter is utilized. Horizontal filtering of the chrominance component may be performed to reduce "cross-luminance" artifacts.

Image rotation is also preferably provided by the processor 66. If indicated by the user, the image is rotated either clockwise or counterclockwise. The image rotation algorithm is designed for most efficient memory utilization, requiring no additional memory. The rotation algorithm is described in a later section. The processor also preferably provides video computation. The decoded, processed image is converted into a fully computed television video signal, including black level, luminance scaling, chrominance-to-UV conversion, and chrominance I/Q modulation.

The FPGA or ASIC 60 may also provide the function of a video transfer controller 68, providing transfer of fully computed video images from the Image Processing Memory to the Video Memory. Preferably, such transfer may occur only when the Video Memory is not being accessed for image readback operations. This method eliminates the need to use a more costly dual-port memory device.

The video transfer function may also provide progressive-to-interlace mapping of image scanlines into interlaced video fields. It may also provide a video transfer algorithm to accomplish video data transfer during synchronization intervals (narrow EQ pulses, broad EQ pulses, horizontal sync pulses, colorburst, front porch, back porch, and vertical interval video lines).

Figure 11:
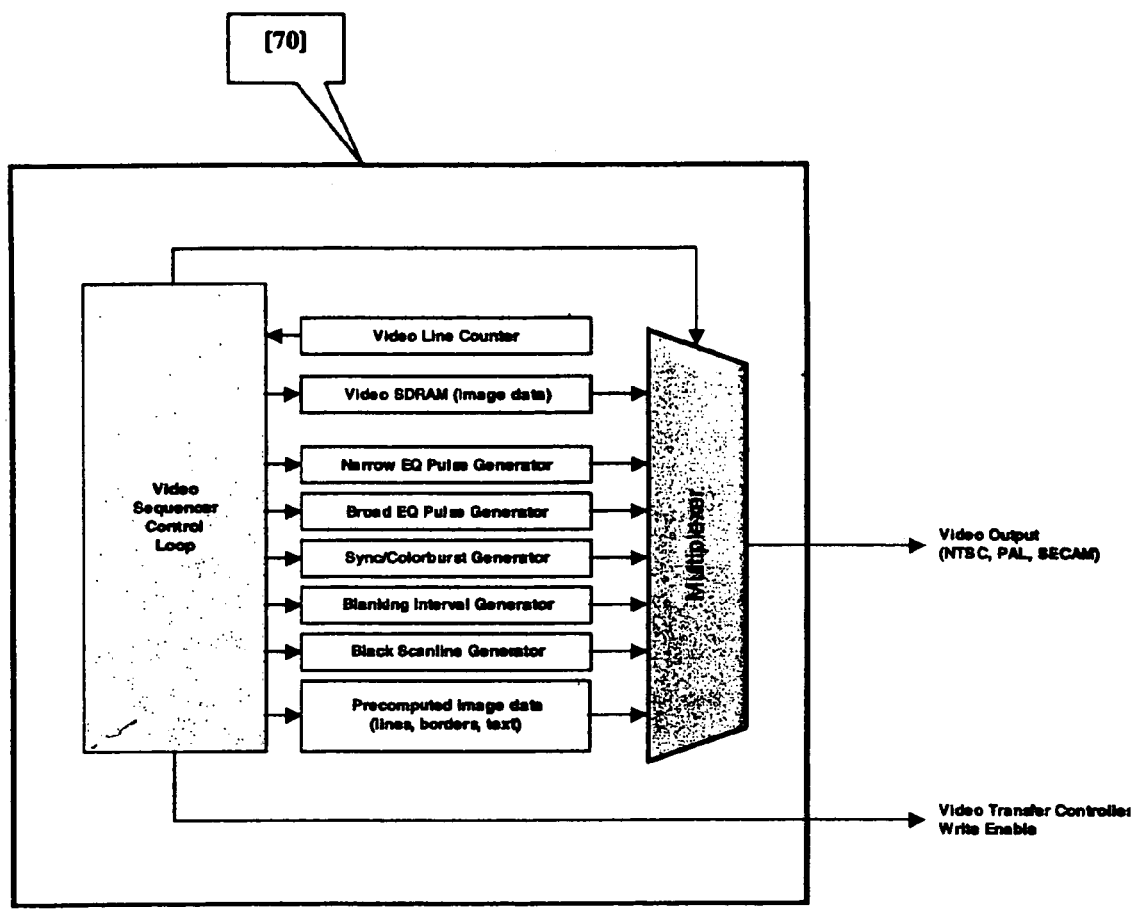
FIG. 11 illustrates a preferred embodiment of a Video Sequencer.

During video transfer operations, the aforementioned synchronization intervals are preferably controlled by a "Video Sequencer" 70. A preferred embodiment of the Video Sequencer 70 is illustrated in FIG. 11. The Video Sequencer preferably provides for control of Video Memory SDRAM initialization, read and write cycles, row precharge and refresh cycles. The Video Sequencer may also provide for generation of the video synchronization template for NTSC, PAL, or SECAM. This includes narrow EQ pulses, broad EQ pulses, horizontal synchronization pulses, colorburst, blanking intervals, vertical interval video lines, and other required elements of the video synchronization template. The video synchronization template is defined by industry standards such as American National Standards Institute (ANSI) 244M for NTSC, European Broadcasting Union (EBU) Tech. 3280-E for PAL, and International Telecommunications Union (ITU) ITU-R BT.470 for NTSC, PAL, and SECAM video standards. The sequencer may also perform video image display, provided by insertion of image data from the Video Memory into the appropriate pixel locations within the video synchronization template. Preferably, any image or portion of an image stored in Video Memory can be mapped to the video display area by simply redirecting the memory read address pointer.

Other functions of the Video Sequencer 70 may include picture-in-picture video insertion, split-image display, and image transition effects facilitated by redirecting the Video Memory address pointer at various times during the display of an image. The sequencer may also provide for differentiation between synchronization intervals (narrow EQ pulses, broad EQ pulses, horizontal sync pulses, colorburst, front porch, back porch, and vertical interval video lines) and video display intervals, thus allowing new video data to be written to the Video Memory at all times other than when the Video Memory is engaged in image display (readback) operations. This method eliminates the need to use a more costly dual-port memory device.

Additional functions of the Video Sequencer 70 may include time-division multiplexing between synchronization intervals, image data being read from the Video Memory, and computed image components such as borders, lines, and text. The Video Sequencer may also insert phase compensation pixels to provide synchronous inter-frame video phases. This method provides reduction or elimination of dot-crawl in NTSC television displays, and it also reduces the Video Memory capacity requirement by 2:1 in NTSC and PAL television systems by eliminating the need for duplicated data in subsequent frames. The sequencer may also display a blank video screen by inserting black-level pixels into the active video area of the video synchronization template.

Referring again to FIG. 9, the FPGA or ASIC 60 also preferably includes an infra-red (IR) receiver 72, providing some or all of the following: (i) recognition of a valid IR transmission protocol (as opposed to background noise); (ii) recognition of a valid code corresponding to the set-top box device (as opposed to codes possibly intended to address other devices); (iii) recognition of the transmitted command code, corresponding to a press of a particular button on the remote control; (iv) recognition of a continuous stream of command codes, indicating that a button has been pressed for an extended period of time; (v) issuance of an interrupt to the CPU, the image decoding, or the image processing algorithms, when a valid set of codes has been recognized; (vi) transmission of command code data to the CPU; and (vii) a provision to selectively enable or disable CPU interrupt assertion associated with any specific command code.

The FPGA or ASIC 60 also preferably includes the function of a Direct Memory Access (DMA) controller 74, providing efficient data transfer from the external storage medium, such as a floppy disk 92 and controller (PDC) 94, to the Image Processing Memory 104. This feature provides the ability to store the contents of the floppy disk or other storage medium in the Image Processing Memory 104, thus providing rapid recall of previously loaded images. The DMA controller 74 also provides efficient data transfer from the external ROM 96 to the Image Processing Memory 104 and the internal SRAM 80. This feature provides the ability to transfer ROM-based images such as informational messages to the Image Processing Memory 104. The DMA controller 74 also provides efficient data transfer from the Image Processing Memory 104 to the internal SRAM 80. This provides the ability to transfer raw image data directly into the image decoder 64. The DMA controller 74 also provides SDRAM refresh cycles during the time the CPU has granted the bus.

The FPGA or ASIC 60 also preferably includes the functions of a SDRAM controller 76, providing control of Image Processing Memory SDRAM initialization, read and write cycles, row precharge and refresh operations, as well as translation of CPU Read, Write, and Refresh commands into SDRAM access cycles.

Another FPGA/ASIC 60 function may include that of a programmable timer 78, providing CPU interrupts at repeatable time intervals. This facilitates CPU processes which require an accurate time reference, such as (1) photo transition timing in the automatic "slideshow" mode; (2) distinguishing between a single-button press and a held button as may be asserted by the user via the remote control device; and (3) determination that a process has exceeded a pre-allowed maximum time interval, such as could occur when attempting to decode a corrupted image. The timer 78 may also provide the ability to reload the timer to any arbitrary start value via a CPU command, providing the flexibility to use the timer for various purposes. The timer 78 also preferably provides the ability to program a 1-byte or other size prescaler register used to configure the timer clock produced by dividing the system clock down to a lower frequency. This allows a wider range of possible timer interval periods.

The FPGA or ASIC 60 also preferably includes Internal Static Random Access Memory (SRAM) 80, providing (i) temporary storage of a Huffman code table associated with each image (ii) temporary storage of quantization table data associated with each image; (iii) efficient EDCT computation; (iv) temporary storage of IDCT Minimum Coded Unit (MCU) results prior to transfer to Image Processing Memory 104; (v) first-in-first-out (FIFO) buffering for efficient transfer of raw image data images from Image Processing Memory 104 to the image decoder 64; and/or (vi) FIFO buffering for efficient transfer of fully computed video images from Image Processing Memory 104 to Video Memory 102.

The FPGA or ASIC 60 also preferably includes a floppy disk controller (FDC) interface 82 or other interface to the storage medium, providing logic required to interface FDC or storage medium signals to the CPU.

The ASIC or FPGA 60 may also provide the function of a Control Processing Unit (CPU) 62. In the preferred embodiment, the CPU 62 is a standard Z80 processor core implemented as a stand-alone component. The Z80 processor code may also be implemented within the FPGA/ASIC 60 as a synthesized HDL core, and is readily available as such in the industry. However, other processing devices may be used.

The CPU 62 provides system power-up and initialization of FPGA/ASIC registers. The CPU 62 also provides disk media operations, including reading of the disk directories, File Allocation Tables (FAT), and files; computing the track, cylinder, and head locations needed to read desired disk sectors; controlling the disk drive motor and head positions; reading disk data; and transferring disk data to the Image Processing Memory 104 for later use. The CPU 62 also provides interpretation and execution of user commands as received via the IR receiver 86 or front-panel interface; coordination of the image decoding, image processing, video transfer, and video display processes; and coordination of images stored in Video Memory 102. This includes updating the Video Memory cache to maintain the Present Image, Previous Image, and Next image as available for display at all times. Finally, the CPU 62 may provide configuration of the DMA controller for each DMA transfer cycle.

The FPGA or ASIC 60 also preferably provides Image Processing Memory bus arbitration and multiplexing logic 83. The Image Processing Memory 104 is accessed by the CPU 62, the Memory Controller 76; the DMA Controller 74, and the Image Processor 66 at different times and for different purposes. It is essential to ensure seamless handover of control between these various structures accessing the Image Processing Memory 104. The Image Processing Memory arbitration and multiplexing structure monitors bus requests from the various structures which access the Image Processing Memory 104, and it provides synchronous and exclusive multiplexing of the Image Processing Memory data, address, and command buses.

The FPGA/ASIC 60 should also include Video Memory bus arbitration and multiplexing logic 83. The Video Memory 102 is accessed by both the video transfer controller 68 (during Video Memory write operations) and by the Video Sequencer 70 (during Video Memory read operations). It is essential to ensure seamless handover of control between these two structures accessing the Video Memory. The Video Memory arbitration and multiplexing structure monitors bus requests from the structures which access the Video Memory 102, and it provides synchronous and exclusive multiplexing of the SDRAM data, address, and command buses.

The hardware also preferably includes a clock oscillator 84. In a preferred embodiment, the oscillator 84 has a frequency equal to four times the color subcarrier frequency of the TV standard being employed. For NTSC, the crystal frequency is 14.318180 Mz. For PAL, the crystal frequency is 17.734475 MHz. However, other frequencies may be used in alternate embodiments.

When a remote control is included, the hardware should also include an infra-red (IR) receiver 86. This can include a commercially available IR receiver diode, capable of demodulating a received IR signal into its constituent digital data component.

One or more pushbutton switches 88 should also be provided. In addition to remote-control operation, it may be desirable to access certain functions from the set-top box front panel. For example, in the preferred embodiment, a pushbutton is provided to enable and disable the automatic slideshow mode. Switches may also be employed for other functionality, including Power on/off, Next Image, Previous Image, Rotate Image, Return to Contact Sheet, etc.

Light Emitting Diodes (LEDs) 90, such as two color LEDs, are used in the preferred embodiment to indicate the operational status of the unit to the user. A green light indicates that the Next Image is processed and ready for viewing. A yellow light indicates that disk access is in process, or that the Automatic Slideshow mode is enabled. LEDs may be employed for other purposes, such as to indicate power on, error conditions, etc.

The hardware also includes a storage medium 92. In the preferred embodiment, a floppy disk drive (FDD) is used to access stored image files. An industry-standard drive is preferably utilized. Since all contemporary media utilizes similar data, addressing, and control interfaces, the use of other media types is foreseeable within the scope of the invention. These include hard disk drives, solid-state "flash" memory, CD-ROM, DVD-ROM, and wireless interfaces.

The hardware also includes an FDD or other controller (FDC) chip 94. For example, an industry-standard FDC chip may be used to provide physical interface to the FDD. The FDC chip 94 provides generation of electrical signals to drive the FDD motor and read/write head, as well as certain command interface signals.

The hardware should also include Read-Only Memory (ROM) 96. The ROM 96 is used to hold the CPU program execution code. The CPU 62 retrieves code instructions from the ROM 96 whenever the CPU is active. The ROM 96 may also be used to store informational images ("Loading Next Image . . . ", etc.). Informational messages may be displayed as needed to inform the user of the status of the device or of error conditions. These images are stored in standard JPG format to conserve ROM area, and are decoded and processed identically to images read from the disk media.

The hardware should also include a video input conned 106, a video output connector 108, and a video passthrough circuit 98. Some TVs have only a single video input connector. In this case, it may be necessary to reconnect cables in order to switch between use of the invention and a secondary video device such as a VCR or DVD player. For this reason, a video passthrough circuit 98 is optionally and preferably provided. In a preferred embodiment, the video passthrough circuit 98 is a conventional video switch that connects the internally generated video signal through to the video output connector 108 when the invention is in use. At other times, the video input connector 106 is switched through to the video output connector 108, thus automatically reconnecting the secondary video device to the TV video input. The video passthrough circuit 98 should contain an analog lowpass filter to reduce spectral emissions above the video passband.

The hardware also preferably includes a digital-to-analog converter (DAC) 100. The DAC 100 is an industry-standard component that translates a digitally-represented video signal into the corresponding analog representation. In the preferred embodiment, a 12-bit DAC (e.g., having 4096 discrete levels of analog resolution) is utilized. However, either a 10-bit or 8-bit DAC will provide acceptable performance for TV viewing. Other DACs also may be used. The DAC 100 may also be implemented as a binary resistor network. This entails connecting a binary progression of resistor values to each of the ASIC/FPGA digital video output pins, and then connecting the opposite ends of the resistors together. A preferred embodiment would be to connect a 300 ohm resistor to the Most Significant Bit (MSB), a 600 ohm resistor to the second MSB; a 1200 ohm resistor to the third MSB, and so on. This choice of resistors provides a parallel output impedance of approximately 75 ohms. This method is somewhat less accurate compared with using an industry-standard DAC, but also provides acceptable TV viewing performance.

The hardware should include a Image Processing Memory 104. In the NTSC embodiment, this is preferably a standard 2 MB SDRAM; in the PAL embodiment, this is preferably a standard 8 MB SDRAM. The Image Processing Memory 104 may be used for some or all of the following purposes, and preferably in the following amounts when a floppy disk is used: (i) Preferably 32 kB may be used for CPU execution (program stack, variables, op-codes; (ii) 1.44 MB may be used for storing the contents of one floppy disk; and (iii) 0.5 MB (NTSC) or 1 MB (PAL) may be used for image processing operations (reconstruction of image color planes, rescaling, filtering, rotation, and video processing). The Image Processing Memory 104 can be used for multiple purposes, and can be accessed at different times by different structures within the invention. In each case, the structure accessing the Image Processing Memory 104 provides complete management of read, write, and refresh operations. During CPU program execution, the CPU 62 accesses the SDRAM 104 via the HDL Memory Controller 76 module described above. During DMA transfers, the CPU 62 first configures the DMA controller 74. The DMA controller 74 then directly accesses the Image Processing Memory 104. During image processing operations, the Image Processor 66 directly accesses the SDRAM 104 for reading pre-processed image pixels and writing post-processed image pixels.

Finally, there is preferably a single SDRAM chip referred to as the "Video Memory" 102. This may be implemented as a standard 2 MB or 8 MB SDRAM depending on the desired number of fully processed video images to be cached. The Video Memory 102 provides storage for fully computed video images. The Video Memory 102 stores several fully computed video images. For example, in the NTSC embodiment, each video image is preferably 720×460 pixels in size, requiring 331,200 bytes. A 2 MB Video Memory can accommodate up to six image blocks of this size.

In the preferred embodiment, three non-overlapping areas of the Video Memory are allocated for the storage of computed video images. These are referred to as the Current Image (the image currently being displayed), the Previous Image (the image that would be displayed if the user pressed the "back" button), and the Next Image (the image that would be displayed if the user pressed the "forward" button). Also, preferably, up to three areas of the Video Memory are allocated for images containing informational messages. These may include a "Loading Next Image" message, a "Splash Screen" message that is displayed upon power-up, and an "Error Message" informing the user that a bad or incompatible image has been encountered.

The Video Memory 102 may be accessed by at least two structures within the design. Data may be written to the Video Memory 102 via the video transfer controller 68. This is a synthesized HDL structure that transfers fully processed image data from the Image Processing Memory to the Video Memory. The video transfer controller 68 should write data to the Video Memory 102 using a burst write operation, which maximizes readback efficiency and permits continuous data playback. Preferably, the video transfer controller 68 will write data to the Video Memory 102 only when two conditions are met: The SRAM FIFO buffer used to transfer data from the Image Processing Memory 104 has been filled; and the Video Sequencer 70 has indicated that there is sufficient time remaining prior to the start of the next Video Memory read burst to allow a write burst to be initiated and concluded.

The Video Memory 102 preferably stores data in a linear address map to enable continuous readback of video data. Data should be written to the Video Memory 102 in the exact order that it will be played back. For example, all the scanlines of video field 1 (even image lines) may be written first, followed by all the scanlines of video field 2 (odd image lines). Data bursts comprising each video scanline are written to alternating SDRAM banks. This allows continuous readback of video data, as one bank can be activated and prepared for a Read burst while another bank is concluding a Read burst.

The Video Memory 102 may be engaged in "Readback" mode whenever both of the following conditions are met: (i) a CPU command has been issued to the Video Sequencer 70 indicating the display of a video image located at a specific video SDRAM memory area; and (ii) the current Video Sequencer line number and pixel count correspond to coordinates of the active video display area.

The Video Sequencer 70 may alternate between video images at any 8-byte boundary by simply redirecting the Video Memory address pointer prior to beginning the burst read operation. This feature provides some or all of the following capabilities:

(i) Images stored in Video Memory 102 may be interchanged in a near-instant manner. For example, if the Current Image, Previous Image, and Next Image have all been written to separate blocks within the Video Memory 102, and if the Current Image is being displayed, the device can immediately display either the Previous Image or Next Image upon receipt of a user command.

(ii) An automatic, rapid-animation slideshow can be produced, with several images being interchanged at a rate of once per frame (approximately ⅓₀th of a second per image).

(iii) Split-screen displays are facilitated. For example, by redirecting the address pointer near the bottom of the image, an information message or image subtitle may be displayed in place of the bottom portion of the image.

(iv) Picture-in-picture insertion is facilitated. For example, by redirecting the address pointer during a group of Readback accesses, data from a portion of the Current Image may be replaced by data read from an equally-sized portion of any other image stored in the Video Memory 102.

(v) Lines, borders, text, and transitional effects are facilitated. For example, in place of any 8-byte burst, arbitrary video levels may be inserted. This feature may be used to insert screen text, lines, borders, and transitions in lieu of an 8-byte data burst.

(vi) Image transition effects are facilitated. For example, a new image may replace a Previous Image by "wiping" the new image downwards over the Previous Image. This is achieved by alternating the Video Memory read address pointer between the new image and Previous Image, while simultaneously incrementing the address pointer at the start of each video field. Similarly, sideways wiping, random transitions, and other related effects are possible by incrementing the Video Memory address pointer as needed to accomplish the desired transitional effect.

Figure 12:
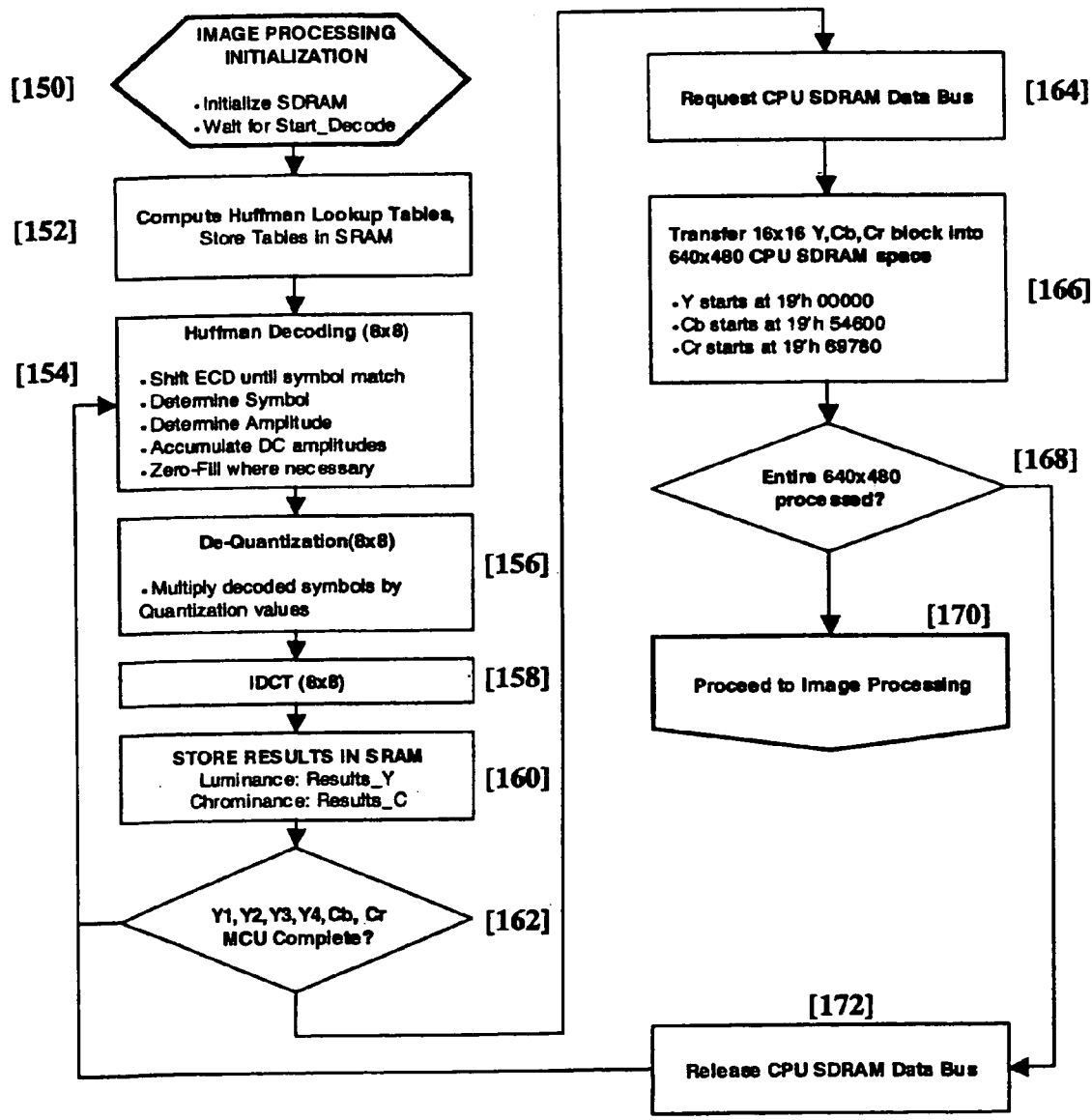
FIGS. 12-14 are process flow diagrams illustrating preferred embodiments of image processing methods in the present invention.
Figure 13:
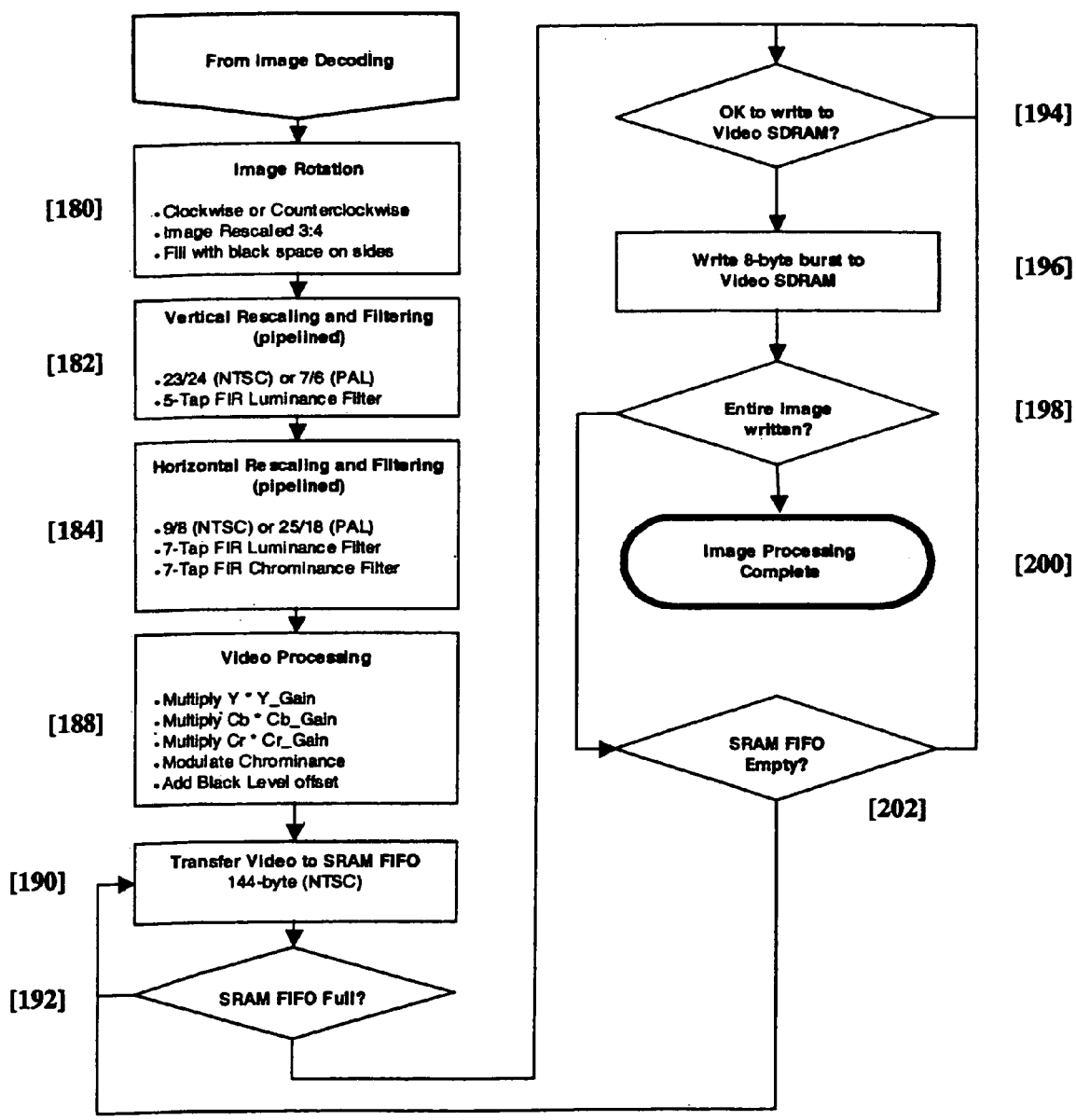
Figure 14:
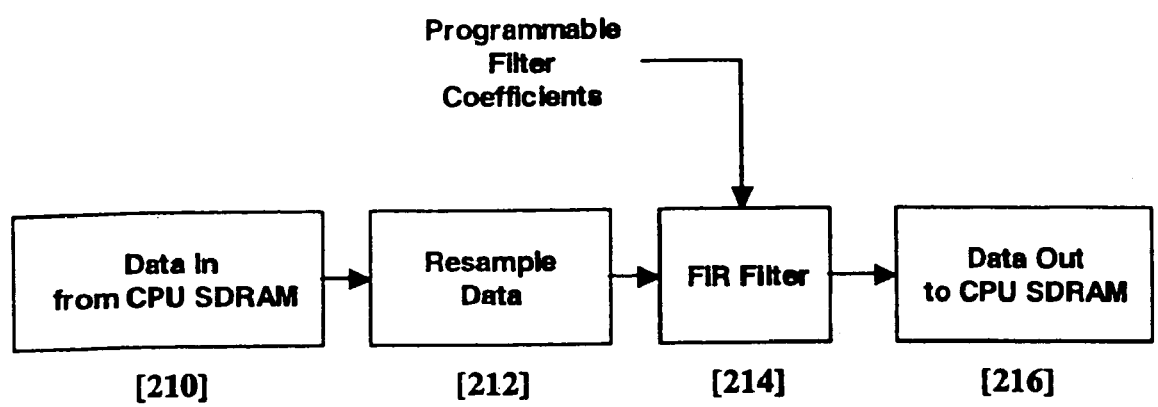

The Image Decoding, Image Processing, and Video Data Transfer flow are unique to this invention, and preferred embodiments of such features are described in FIGS. 12, 13, and 14 along with the following text.

For JPG Image Decoding, as illustrated in FIGS. 12 and 13, upon power-on, the Image Processing Memory is initialized (step 150). The Image Decoder then waits until a Start_Decode command or other appropriate command is received from the CPU. This command indicates that an image is ready to be decoded, and provides associated information such as whether the image will require rotation.

The Image Decoder transfers JPG file Huffman table specifications and Quantization Tables to the Symbol Lookup Table (LUT) and Quantization LUT SRAMs. The Image Decoder then computes the JPG Huffman decoding tables, and stores these tables in the Huffman Codes SRAM block (step 152).

The Image Decoder then requests that the JPG Entropy Coded Data (ECD) be provided (step 154). The CPU provides this data stream 512 bytes at a time via the ECD SRAM buffer (the exact size of this buffer is not important, and thus delivery may occur in increments that are other than 512 bytes). The Image Decoder shifts the data stream one bit at a time from the ECD SDRAM buffer until a Huffman code match is identified. When a valid code is identified, the image decoder proceeds to determine the Huffman symbol and amplitude. As symbols and amplitudes are computed, the resultant 8×8 matrix is filled. Optionally, matrices of other sizes may be used. Zero-fills, end-of-block codes, and DC accumulation are performed in accordance with standard JPG requirements. Huffman decoding may be implemented using techniques common in the art.

After each 8×8 Luminance (Y) or Chrominance (Cb or Cr) matrix has been computed, the matrix is dequantized by multiplying each pixel of the matrix by the corresponding amplitude quantization coefficient provided in the JPG file header (step 156).

After the 8×8 result has been dequantized, an Inverse Discrete Cosine Transform (IDCT) is performed (step 158). In the preferred embodiment, the IDCT carries a fixed precision of 16 bits per color component. The IDCT is implemented using techniques common in the art.

The computed IDCT results are stored in the Results_Y and Results_C SRAM blocks (step 160). The Results_Y SRAM preferably holds up to four 8×8 Luminance blocks, whereas the Results Y_SRAM preferably holds up to four 8×8 Chrominance Blocks. These two SRAMs can therefore accommodate one full minimum coded unit (MCU) consisting of up to four luminance blocks, one Cb block, and one Cr block. The actual utilization of these SRAMs will depend on the vertical and horizontal sampling ratios of the source image.

Once all the Y and C blocks associated with one MCU have been decoded and stored in SRAM, they are transferred to the appropriate locations in the area of the Image Processing Memory "Canvas" that will be used for image processing.

In the NTSC embodiment, the Image Processing Memory preferably includes a 512 kB area used for image processing. This area is preferably subdivided as follows: (1) 345,600 bytes are allocated for the 720×480 Y Canvas; (2) 172,800 bytes allocated for the 360×240 Cb Canvas; (3) 172,800 bytes are allocated for the 360×240 Cr Canvas; and (4) 345,600 bytes are allocated for the final processed video. This final processed video area overwrites the Y Canvas during video processing, and as such does not require any additional SDRAM area.

In the PAL embodiment, the Image Processing Memory preferably includes an area, preferably of 1 MB size but alternately of other sizes, used for image processing. This area is preferably subdivided as follows: (1) 492,800 bytes are allocated for the 880×560 Y Canvas; (2) 246,400 bytes are allocated for the 440×280 Cb Canvas; (3) 246,400 bytes are allocated for the 440×280 Cr Canvas; and (4) 985,600 bytes are allocated for the final processed video. This final processed video area overwrites the Y, Cb, and Cr Canvases during video processing.

When the decoded MCUs are transferred from the internal SRAM to the Image Processing Memory, they are arranged in the Image Processing Memory Canvases in the same row-column format of the original image. The color components (Y, Cb, and Cr) are maintained in separate memory Canvases and processed independently until the final video processing stage.

In order to accomplish the transfer of data from internal SRAM to the external Image Processing Memory, the Image Processor must temporarily assume control of the Image Processing Memory. This transfer of control is preferably achieved as follows: After an MCU has been decoded and the results stored in SRAM, the image processor asserts a bus request to the CPU. When the CPU completes the instruction cycle in process, it will release control of the bus and assert the Bus Acknowledge signal (step 164). When the image processor senses the Bus Acknowledge signal, it assumes control of the Image Processing Memory data, address, and control buses. After assuming control of the Image Processing Memory bus, the Image Processor reads data from the Results_Y and Results_C SRAMs, and writes this data to the Image Processing Memory (step 166). Data is arranged in the Image Processing Memory such as to form a bitmapped reconstruction of the original image, in three separate color planes (Y, Cb, Cr). While data is being transferred from the Image Processing Memory, the image processor monitors an SDRAM refresh timer. The Image Processor interrupts image processing operations as needed to assert SDRAM refresh cycles for the maintenance of the Image Processing Memory. After an MCU has been fully transferred to the Image Processing Memory, the image processor checks to see if all MCUs have been transferred (i.e., if the image has been completely assembled in the Image Processing Memory Canvas areas) (step 168). If all MCUs have been transferred, the Image Processor proceeds to the image processing operations (step 170). Otherwise, control of the Image Processing Memory is released back to the CPU to facilitate decoding of the remaining JPG data (step 172).

In order to process data stored in the Image Processing Memory image Canvas, the Image Processor must temporarily assume control of the Image Processing Memory. This transfer of control is preferably achieved as follow. After all MCUs have been decoded and the results transferred to the Image Processing Memory, the Image Processor asserts a bus request to the CPU. When the CPU completes the instruction cycle in process, it will release control of the bus and assert the Bus Acknowledge signal. When the Image Processor senses the Bus Acknowledge signal, it assumes control of the Image Processing Memory data, address, and control buses. After assuming control of the Image Processing Memory bus, the Image Processor executes the image processing functions described in the section below (step 170). While image processing operations are underway, the Image Processor monitors an SDRAM refresh timer. The Image Processor interrupts image processing operations as needed to assert SDRAM refresh cycles for the maintenance of the Image Processing Memory. Once all image processing and video transfer operations are complete, control of the Image Processing Memory is released back to the CPU.

Referring to FIG. 13, for Rotation Processing 180, the image may be rotated either clockwise or counterclockwise. If the user has indicated that an image is to be rotated, rotation should be performed prior to other image processing operations. This method is preferred because subsequent image processing operations involve dimension-specific rescaling and filtering.

Vertical rescaling and filtering 182 may also occur. The image is preferably rescaled vertically by the ratio of 23:24 (NTSC) or 7:6 (PAL). This results in the 480 rows of the original image being rescaled to 460 rows (NTSC) or 560 rows (PAL). These ratios were chosen to provide accurate 4:3 aspect ratio on the TV display taking into account the horizontal sampling frequency that is utilized, as well as providing a vertical overscan ratio of approximately 2.5%.

The image is filtered vertically in the luminance component to reduce inter-field video flicker. In the preferred embodiment, a 7-tap FIR filter with coefficients such as 0-3-29-64-29-3-0 provides significant flicker reduction with minimal loss of resolution. The vertical rescaling and filtering operations should be pipelined to minimize processing time.

Horizontal resealing and filtering 184 also preferably occur. The image is rescaled horizontally by the ratio of 9:8 (NTSC) or 25:18 (PAL). This results in the 640 rows of the original image being rescaled to 720 rows (NTSC) or 880 rows (PAL). These ratios were chosen to provide accurate 4:3 aspect ratio on the TV display taking into account the horizontal sampling frequency that is utilized, as well as providing a horizontal overscan ratio of approximately 2.5%.

The image luminance component is filtered horizontally to reduce cross-chrominance artifacts. These artifacts are manifested as "false" color that is evident in the area of highly detailed luminance transitions. In the preferred embodiment, a 7-tap FIR filter is utilized.

The image chrominance component is filtered horizontally to reduce cross-luminance artifacts. These artifacts are manifested as "zipper" patterns that are evident in the area of highly detailed chrominance transitions. In the preferred embodiment, a 7-tap FIR filter is utilized. The horizontal rescaling and filtering operations are pipelined to minimize processing time.

In the video processing aspects, the three color components of the image are preferably mathematically processed (step 188) to produce an NTSC, PAL, or SECAM video signal. Luminance component data is multiplied by a luminance gain constant. Chrominance component data are multiplied by chrominance gain constants. Chrominance data are modulated by the phase of the video subcarrier. Scaled luminance and modulated chrominance are added together. Video black level is added to the computed result. Values outside of the DAC range (e.g., [0,255] for an 8-bit DAC) are clipped. Final computed video data overwrites the original luminance component area in SDRAM.

Preferred video data transfer steps are also illustrated in FIG. 13. After video processing of the entire image has concluded, the computed video data is transferred from the Image Processing Memory to the Video Memory so that it may be accessed and displayed by the Video Sequencer (step 190). Video data transfer (i.e., writing to the Video Memory) should only be accomplished during time intervals when the Video Memory is not engaged in video data readback operations. This method eliminates the need to use a more costly dual-port memory device. A small SRAM FIFO buffer (preferably several hundred bytes in length) may be used to facilitate efficient data transfer. The Image Processor fills the SRAM FIFO buffer with data, and then asserts the flag (e.g., SRAM_FULL) indicating that the SRAM FIFO has been filled. When the Video Transfer Controller senses the SRAM_FULL flag 194, it begins the process of emptying the SRAM FIFO, writing the data to the Video Memory (step 196). Preferably, data is written in bursts of 4 or 8 data points at a time to alternating SDRAM banks to facilitate efficient transfer. Prior to initiating a Video Memory write burst, the Video Transfer Controller first monitors a flag (e.g., Enable_Write) that is controlled by the Video Sequencer (step 192). Enable_Write is asserted whenever the Video Sequencer determines that sufficient clock periods remain prior to the next SDRAM readback operation. For example, for a burst write of 4 pixels, at least 7 clock cycles should remain prior to the next SDRAM read operation to allow time to initiate and conclude the burst write operation. The Video Transfer controller continues writing bursts of video data to the Video Memory until: (i) the SRAM FIFO has been emptied; or (ii) the Video Sequencer negates Enable_Write or, (iii) the entire image has been written. When the SRAM FIFO has been emptied, and its contents written to the Video Memory, the SRAM_FULL flag is cleared, thus allowing the cycle to repeat for the next block of data to be transferred. The process continues until the entire image has been transferred to the video SRAM.

Preferred methods of FIR Rescaling and Filtering, and pipelining the same are shown in FIG. 14. For each color component, data points are read consecutively from Image Processing Memory (step 210). Data points are fed into a real-time resampling algorithm which upsamples and downsamples data as needed to meet the desired resampling ratio (step 212). Data points flowing out of the resampling algorithm are fed directly into the FIR filter (step 214). The FIR filter should be programmed with coefficients that are tailored for each dimension and each color component. Data points flowing out of the FIR filter are written immediately back to the Image Processing Memory, overwriting data which has been processed and is no longer needed (step 216). This "in-place" computation reuses SDRAM memory, thus minimizing the SDRAM memory requirement.

Image rotation is often desirable for certain images, such as those captured with the camera held in the "portrait" orientation. The Invention utilizes a unique image rotation algorithm that fits the rotated image entirely within the viewable area of the TV screen. It also provides "letterboxing", or addition of black space, to the sides of the rotated image. In addition, it preferably accomplishes image rotation in-place; that is, without requiring any additional memory buffering.

Figure 15:
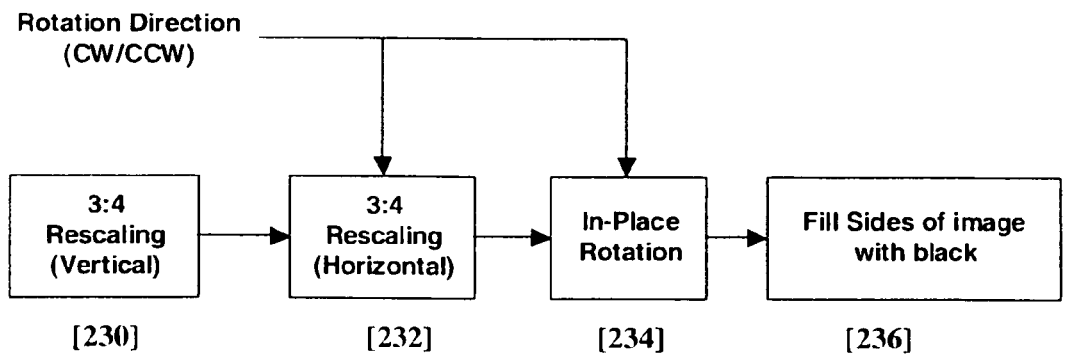
FIGS. 15-16 illustrate a preferred method of rotating an image in the invention.

A preferred method of rotation is illustrated in FIG. 15. If needed, rotation is accomplished immediately after image decoding, prior to other image processing operations. This method permits a fixed rotation algorithm to be used, regardless of the TV video standard (NTSC, PAL, or SECAM). Referring to FIG. 15, first, the image is rescaled vertically, preferably by the ratio of 3:4 (step 230). For example, this reduces the original image height of 480 pixels to a rescaled height of 360 pixels. Other scaling and sizes may optionally be used. Second, the image is rescaled horizontally, preferably by the ratio of 3:4 (step 232). This reduces the original image width from 640 pixels to 480 pixels. The active image area is now 360 pixels high by 480 pixels wide. (When rotated, the image will be 480 pixels high, perfectly fitting the TV screen). Again, other scalings and sizes may be used Also optionally, horizontal rescaling may be performed prior to, or concurrently with, vertical rescaling. Third, the rescaled image is offset horizontally by the offset shown as X1 (step 234). For Clockwise rotation, X1 is preferably 140; for Counterclockwise rotation X1 is preferably 260. With this offset, the square box bounding the rescaled image may be rotated, with the result that the rotated image will be perfectly centered in the 640×480 matrix. After rotation, sides of the screen may be filled with black (step 236).

Figure 16:
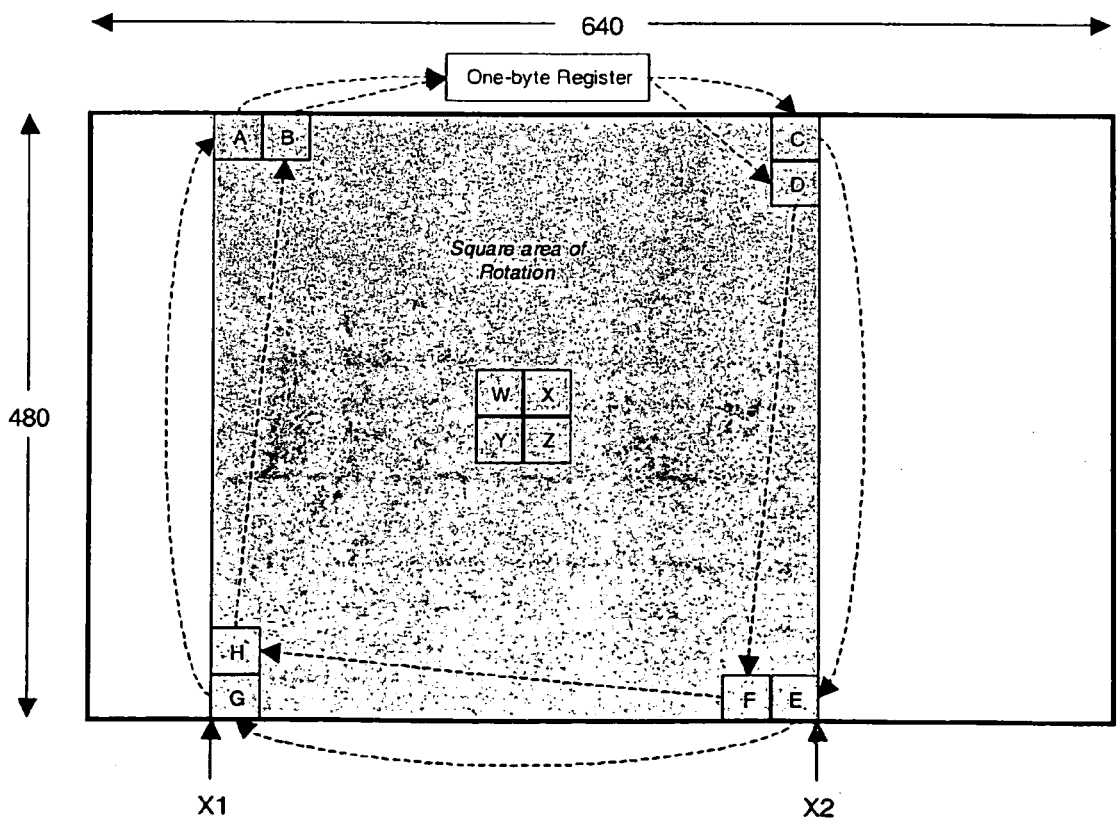

In-place image rotation is preferably accomplished as shown in FIG. 16. The portion of the image to be rotated is a square area extending vertically from the top of the image to the bottom of the image; horizontally from X1 to X2. Referring to FIG. 16, Pixel A is stored temporarily in a one-byte register. Pixel G is transferred to the location of Pixel A. Pixel E is transferred to the location of Pixel G. Pixel C is transferred to the location of Pixel E. The Pixel A value, stored in the temporary register, is written to Pixel C. These steps are repeated for pixels B, D, F, and H, as shown. The process continues until the entire outer ring of pixels has been rotated, using the method described above. The outer ring of pixels is defined as all the pixels bordering the edges of the square area to be rotated.

The process then continues by rotating the ring of pixels directly inside to the outer ring, using the method described above. The process continues as shown, processing all rings from the outer ring to the central ring of the square area shown. The central ring is comprised of the four pixels W, X, Y, and Z located in the center of the square area.

Clockwise rotation has been described. Counterclockwise rotation can be done using the identical algorithm performed in the reverse angular direction.

When viewing a photo album, it is often desirable for the user to be able to navigate to any given image without viewing all images that may precede the desired image. The Invention facilitates rapid navigation to any desired image in the album. Referring again to FIG. 7, navigation is facilitated by the "contact sheet" which is created by the PC based album creation software. This contact sheet is preferably the first image displayed upon viewing a disk album. If the user wishes to display a specific image within the album, the user may make note of the relative position of the image within the album by examining the contact sheet. If the user observes that the desired image is, for example the twelfth image in the album, the user may navigate immediately to this image by pressing the "forward" button twelve times in succession. In the preferred embodiment, if the IR remote control receiver detects a press of the "forward" or "reverse" buttons while an image is being processed, the Current Image processing operation is halted. The image index counter (the counter which determines the Next Image to be displayed) is incremented (or decremented) with each detected press of the forward (or reverse) buttons. When the processor detects that the user has stopped pressing the forward or reverse button, the image index counter is- read, and the corresponding image is decoded and then displayed.

If the user wishes to skip over a group of images, in the preferred embodiment, this can be accomplished by pressing and holding the forward or reverse button. In addition, in the preferred embodiment, if either button is held for more than one second, the image index counter advances (or decrements) by five images. This "skip increment" may be easily adjusted to other values.

To further increase navigational performance of the device, the Invention employs "directional" image caching. When the user is observing any image that has been reached in the album, the device begins decoding both the Previous Image (the image immediately preceding the currently displayed image in the ordered album), and the Next Image (the image immediately following the currently displayed image). Within a few seconds, both the Next Image and the Previous Image will be cached in the Video Memory. Thus, after the Current Image has been observed for several seconds, the user may view either the Next Image in the album, or the Previous Image, with zero wait time. This is referred to as "background video caching". To further improve performance, in the preferred embodiment the CPU monitors the direction in which the user is navigating through the album. The order of background video caching is based on the user's direction of navigation.

An example of such a directional image catching procedure is as follows: While the user is viewing an image, take an image designated as number 7 for example (the Current Image), image 6 is designated as the Previous Image and image 8 is designated as the Next Image. If the user then presses the forward button, image 8 is displayed immediately from the Video Memory cache, and re-designated to be the new Current Image. The CPU then initiates processing and caching of image 9 (now becomes Next Image in the direction of navigation). Image 7 remains in the Video Memory cache, but is re-designated as Previous Image.

As an additional example, after viewing image number 7 (the Current Image), the user presses the reverse button four times in rapid succession, indicating a desire to navigate backwards through the album, starting with an initial decrement of four images. The CPU will decrement the image index counter to 3, then re-designate image 3 as the new Current Image. Image 3 will then been processed, transferred to the SDRAM Video cache, and immediately displayed, followed by processing and caching of image 2 (now the Next Image in the direction of navigation) and then image 4 (now the Previous Image in the direction of navigation).

There have thus been outlined, rather broadly, the more important features of the invention in order that the preferred embodiment may be better understood, and in order that the present contribution to the art may be better appreciated. It is to be understood that the Invention is not limited in its application to the details of construction and to the arrangements of the components set forth in the description contained herein or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods and systems for carrying out the several purposes of the present invention.

What is claimed is:

1. A method comprising:
   displaying on a first display device a group of plural images;
   formatting one or more of the plural images as an album;
   making a contact sheet image, the contact sheet image including thumbnail representations of the one or more images of the album;
   converting one or more image files corresponding to the one or more images of the album and the contact sheet image to one or more video signals that are formatted to produce representations of the one or more images of the album and the contact sheet image on a second display device that is different from the first display device; and
   transferring the one or more video signals to the second display device, wherein the contact sheet image is displayed first on the second display device to inform a viewer of the album being viewed;
   wherein a first hardware device performs the formatting the one or more of the plural images as the album, and wherein the formatting the one or more of the plural images as the album further comprises preparing the album for transport to a second hardware device that performs the converting and the transferring.

2. The method of claim 1 wherein the formatting the one or more of the plural images as the album comprises eliminating information from the one or more images.

3. The method of claim 1 further comprising compressing the one or more image files before the transport and decompressing the one or more image files before the converting.

4. The method of claim 1 wherein the preparing the album comprises saving the one or more image files to a removable storage medium.

5. The method of claim 1 wherein the first display device is a computer monitor and the second display device is a standard television.

6. The method of claim 1 further comprising prompting a user to select the one or more images of the album from among the displayed group of plural images.

7. The method of claim 1 wherein the formatting the one or more of the plural images as the album compnses automatically adjusting the one or more images of the album for display in a resolution appropriate for the second display device.

8. A system comprising:
   a first hardware device adapted to (a) display, on a first display device, a group of plural images and (b) format one or more of the plural images as an album and (c) make a contact sheet image, the contact sheet image including thumbnail representations of the one or more images of the album; and
   a second hardware device adapted to (a) convert one or more image files corresponding to the one or more images of the album and the contact sheet image to one or more video signals that are formatted to produce representations of the one or more images of the album and the contact sheet image on a second display device that is different from the first display device, and (b) transfer the one or more video signals to the second display device for display of the contact sheet image first on the second display device so as to inform a viewer of the album being viewed;
   wherein the formatting the one or more of the plural images as the album by the first hardware device comprises preparing the album for transport to the second hardware device.

9. The system of claim 8 wherein the first hardware device is further adapted to compress the one or more image files before the transport, and wherein the second hardware device is further adapted to decompress the one or more image files before the converting.

10. The system of claim 8 wherein the preparing the album comprises saving the one or more image files to a removable storage medium.

11. The system of claim 8 wherein the first display device is a computer monitor and the second display device is a standard television.

12. The system of claim 8 wherein the first hardware device is further adapted to prompt a user to select the one or more images of the album from among the displayed group of plural images.

13. One or more computer-readable media having stored thereon computer-executable instructions for causing one or more processors programmed thereby to perform a method comprising:
   displaying on a first display device a group of plural images;
   formatting one or more of the plural images as an album;
   making a contact sheet image, the contact sheet image including thumbnail representations of the one or more images of the album;
   converting one or more image files corresponding to the one or more images of the album and the contact sheet image to one or more video signals that are formatted to produce representations of the one or more images of the album and the contact sheet image on a second display device that is different from the first display device; and
   transferring the one or more video signals to the second display device for display of the contact sheet image first on the second display device so as to inform a viewer of the album being viewed.

14. The computer-readable media of claim 13 wherein the formatting the one or more of the plural images as the album further comprises preparing the album for transport to a hardware device.

15. The computer-readable media of claim 14 wherein the method further comprises compressing the one or more image files before the transport and decompressing the one or more image files before the converting.

16. The computer-readable media of claim 14 wherein the preparing the album comprises saving the one or more image files to a removable storage medium.

17. The computer-readable media of claim 13 wherein the first display device is a computer monitor and the second display device is a standard television.

18. The computer-readable media of claim 13 wherein the method further comprises prompting a user to select the one or more images of the album from among the displayed group of plural images.

* * * * *

UNITED STATES PATENT AND TRADEMARK OFFICE
CERTIFICATE OF CORRECTION

| | | |
|---|---|---|
| PATENT NO. | : 7,403,212 B2 | Page 1 of 1 |
| APPLICATION NO. | : 11/323248 | |
| DATED | : July 22, 2008 | |
| INVENTOR(S) | : Darryl Richard Schick et al. | |

It is certified that error appears in the above-identified patent and that said Letters Patent is hereby corrected as shown below:

In column 22, line 2, in Claim 7, delete "compnses" and insert -- comprises --, therefor.

Signed and Sealed this
Nineteenth Day of April, 2011

David J. Kappos
*Director of the United States Patent and Trademark Office*